United States Patent
Madsen et al.

(10) Patent No.: US 10,880,184 B2
(45) Date of Patent: Dec. 29, 2020

(54) DATACENTER SERVICE FLOW OPTIMIZATION

(71) Applicant: SEAGATE TECHNOLOGY LLC, Cupertino, CA (US)

(72) Inventors: Christian B. Madsen, Longmont, CO (US); Dmitriy Vassilyev, Longmont, CO (US); Michael McKay, Wellesley (CA); Marcin Lizon, Waterloo (CA)

(73) Assignee: Seagate Technology LLC, Fremont, CA (US)

( * ) Notice: Subject to any disclaimer, the term of this patent is extended or adjusted under 35 U.S.C. 154(b) by 147 days.

(21) Appl. No.: 15/632,799

(22) Filed: Jun. 26, 2017

(65) Prior Publication Data

US 2018/0375741 A1 Dec. 27, 2018

(51) Int. Cl.
*G06F 9/50* (2006.01)
*H04L 12/24* (2006.01)
*G06F 9/48* (2006.01)
*G06F 9/54* (2006.01)

(52) U.S. Cl.
CPC ............ *H04L 41/50* (2013.01); *G06F 9/4843* (2013.01); *G06F 9/5005* (2013.01); *G06F 9/542* (2013.01); *G06F 9/54* (2013.01); *G06F 2209/541* (2013.01); *H04L 41/14* (2013.01)

(58) Field of Classification Search
None
See application file for complete search history.

(56) References Cited

U.S. PATENT DOCUMENTS

| | | | | |
|---|---|---|---|---|
| 8,028,293 | B2* | 9/2011 | Azar | G06F 9/4881 709/226 |
| 8,326,669 | B2* | 12/2012 | Korupolu | G06F 11/0793 705/7.11 |
| 8,909,764 | B2* | 12/2014 | Umanesan | H04L 67/16 370/395.4 |
| 9,235,645 | B1* | 1/2016 | Khafizova | G06F 17/30867 |
| 2003/0191793 | A1* | 10/2003 | Dolin, Jr. | G05B 19/41865 718/103 |
| 2004/0133889 | A1* | 7/2004 | Colle | G06Q 10/06 718/100 |
| 2004/0186687 | A1* | 9/2004 | Ogura | E02F 9/205 702/185 |
| 2006/0233311 | A1* | 10/2006 | Adams, Jr. | H04L 41/064 379/21 |
| 2009/0138313 | A1* | 5/2009 | Morgan | G06Q 10/06 705/7.23 |

(Continued)

*Primary Examiner* — Isaac T Tecklu
(74) *Attorney, Agent, or Firm* — Mueting Raasch Group

(57) ABSTRACT

Systems and methods for improving efficiency in performing service actions for one or more storage systems are described. In one embodiment, the systems and methods include detecting a service event on at least one of one or more storage systems based at least in part on monitoring events on the one or more storage systems, creating a service action based at least in part on detecting the service event, adding the service action to a list of pending service actions associated with the one or more storage systems, and assigning one or more service actions from the list of pending service actions to a service window. In some cases, each service event in the list of pending service events represents an adverse condition awaiting repair in relation to at least one of the one or more storage systems.

18 Claims, 8 Drawing Sheets

(56) References Cited

U.S. PATENT DOCUMENTS

| | | | |
|---|---|---|---|
| 2011/0208567 A9* | 8/2011 | Roddy | B61L 27/0094 705/7.41 |
| 2013/0067484 A1* | 3/2013 | Sonoda | G06F 9/5038 718/103 |
| 2013/0332930 A1* | 12/2013 | Towata | G06F 9/4812 718/102 |
| 2014/0019981 A1* | 1/2014 | Boyer | G06F 9/4843 718/102 |
| 2014/0149987 A1* | 5/2014 | Barillari | G06F 9/4843 718/101 |
| 2014/0165070 A1* | 6/2014 | Persikov | G06F 9/4881 718/103 |
| 2014/0181826 A1* | 6/2014 | Wolf | G06F 9/4843 718/102 |
| 2015/0143381 A1* | 5/2015 | Chin | G06F 9/485 718/104 |
| 2015/0294251 A1* | 10/2015 | Hildmann | G06Q 10/06311 705/7.13 |
| 2016/0085591 A1* | 3/2016 | Taira | G06Q 10/1097 718/103 |
| 2016/0364267 A1* | 12/2016 | Varadarajan | G06F 9/4812 |
| 2017/0017656 A1* | 1/2017 | Zhu | G06F 3/048 |
| 2017/0331906 A1* | 11/2017 | Choi | H04L 41/14 |
| 2017/0357529 A1* | 12/2017 | Venkatraman | H04L 67/22 |
| 2018/0210754 A1* | 7/2018 | Vaish | G06F 9/5011 |

* cited by examiner

DATACENTER SERVICE FLOW OPTIMIZATION

SUMMARY

The present disclosure is directed to methods and systems for improving efficiency in performing service actions for one or more storage systems. In some embodiments, the present systems and methods may monitor one or more storage systems to detect service events then determine an optimized schedule for implementing service actions to handle the service events.

A computing device to improve service action efficiency is described. In some embodiments, the computing device may include one or more processors and memory in electronic communication with the processor. The memory may store computer executable instructions that when executed by the processor cause the processor to perform the steps of detecting a service event on at least one of the one or more storage systems based at least in part on monitoring events on the one or more storage systems, creating a service action based at least in part on detecting the service event, adding the service action to a list of pending service actions associated with the one or more storage systems, and assigning one or more service actions from the list of pending service actions to a next scheduled service window based at least in part on a ranking of the service actions in the list of pending service actions. In some cases, each service event in the list of pending service events may represent an adverse condition awaiting repair in relation to at least one of the one or more storage systems.

In some embodiments, the instructions may cause the processor to rank each service action in the list of pending service actions according to one or more service action criteria, wherein the one or more service action criteria includes at least one of event type, event severity, storage system identifier, event location, number of service actions in the list of pending service actions, service action duration, service window duration, and a distance between an event location of a first service action assigned to the service window and an event location of a second service action assigned to the service window, or any combination thereof.

In some cases, the service action duration of the service event may be based at least in part on an estimated time to perform a repair on the at least one storage system associated with the service event. In some cases, the service window duration may be based at least in part on the service action duration of each service action assigned to the service window.

In some embodiments, the instructions may cause the processor to adjust one or more aspects of the service window based at least in part on at least one of adding of the service action to the list of pending service actions, the assigning of the one or more service actions from the list of pending service actions to the service window, and the ranking of each service action in the list of pending service actions according to the one or more service action criteria, or any combination thereof.

In some cases, adjusting the one or more aspects of the service window includes at least one of adjusting an allotted time associated with the service window, adjusting one or more service actions assigned to the service window, adjusting an order of the one or more service actions assigned to the service window, adjusting a route associated with the one or more service actions assigned to the service window, adding a service action to the one or more service actions assigned to the service window, removing a service action from the one or more service actions assigned to the service window, changing a duration of a service action assigned to the service window, changing a start time of a service action assigned to the service window, and changing an end time of a service action assigned to the service window, or any combination thereof. In some embodiments, the instructions may cause the processor to calculate an allotted time for the service window based at least in part on a selection of one or more service actions to accomplish during the service window.

In some embodiments, the instructions may cause the processor to select which service actions to assign to the service window based at least in part on the ranking of each service action in the list of pending service actions according to the one or more service action criteria and determine an optimized order in which to perform the one or more service actions assigned to the service window based at least in part on one or more aspects of the service actions assigned to the service window.

In some embodiments, the instructions may cause the processor to generate a service map. In some cases, the one or more storage systems include at least one of a computing device with a storage device, a network device with a storage device, a storage server, a storage enclosure, a cloud storage system, and a distributed storage system, or any combination thereof. In some cases, the service map may depict at least one area and a location of each of the one or more storage systems relative to the at least one area. In some embodiments, the instructions may cause the processor to depict the event location of the service event on the service map, wherein a location of the service event is determined based on at least one of a global positioning system (GPS) associated with the at least one storage system, an indoor positioning system (IPS) associated with the last least one storage system, and a local positioning system (LPS) associated with the at least one storage system, or any combination thereof.

In some embodiments, the instructions may cause the processor to provide guidance from a location of a first service action to a location of a second service action based at least in part on displaying the service map on a display of the computing device, wherein the first service action and the second service action are separate service actions assigned to the service window.

A method for improving efficiency in performing service actions for one or more storage systems is also described. In one embodiment, the method may include detecting a service event on at least one of one or more storage systems based at least in part on monitoring events on the one or more storage systems, creating a service action based at least in part on detecting the service event, adding the service action to a list of pending service actions associated with the one or more storage systems, and assigning one or more service actions from the list of pending service actions to a service window. In some cases, each service event in the list of pending service events may represent an adverse condition awaiting repair in relation to at least one of the one or more storage systems.

A non-transitory computer-readable storage medium for improving efficiency in performing service actions for one or more storage systems is also described. In some embodiments, the non-transitory computer-readable storage medium may store computer executable instructions that when executed by a processor cause the processor to perform the steps of detecting a service event on at least one of one or more storage systems based at least in part on monitoring events on the one or more storage systems, creating a service action based at least in part on detecting the service event, adding the service action to a list of pending service actions associated with the one or more storage systems, and assigning one or more service actions from the list of pending service actions to a service window. In some cases, each service event in the list of pending service events may represent an adverse condition awaiting repair in relation to at least one of the one or more storage systems.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

Figure 1:
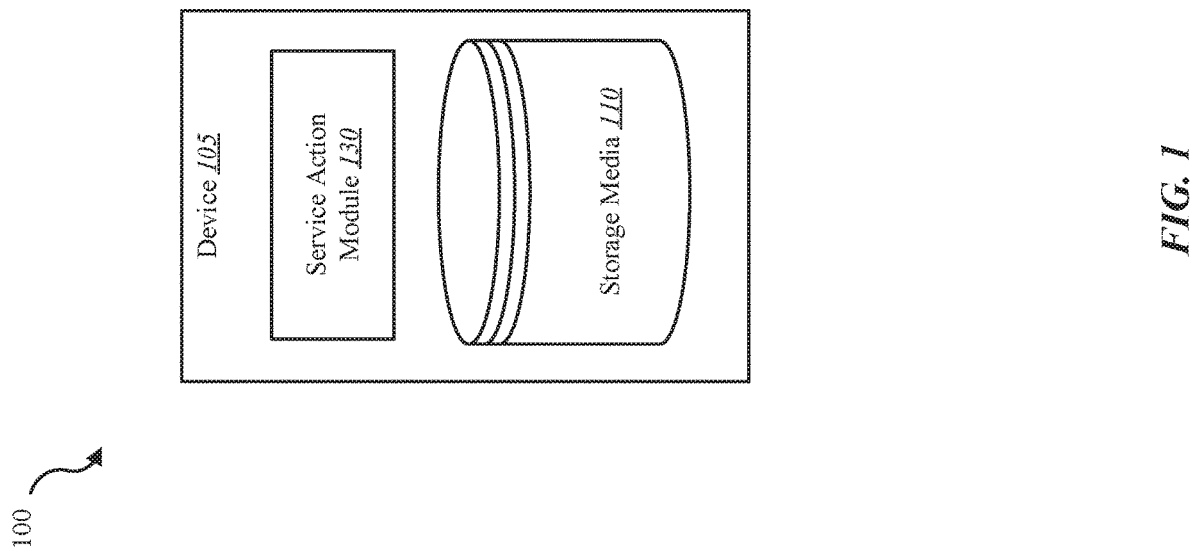
FIG. 1 is a block diagram of an example of a system in accordance with various embodiments.

The following relates generally to an automated event response engine. More specifically, the systems and methods include a framework, process flow, and implementation of an automated event response engine for storage systems. The storage systems may include computer systems with storage such as desktop computers, laptop computers, mobile computers, and the like. In some cases, the storage systems may include dedicated storage systems such as storage servers, storage enclosures, cloud storage systems, distributed storage systems, and the like.

In one embodiment, the present systems and methods optimize datacenter service. In some cases, the present systems and methods may use at least one of service component locations, severity of events, and adjusting the service window, or any combination thereof, to optimize a sequence of service events.

A datacenter may experience regular failures. At a given service window at least one purpose may be to service affected systems as efficiently as possible. The present systems and methods may use input of each failure event to configure a service window. In some cases, the present systems and methods may use metadata associated with an event to configure the service window. For example, the present systems and methods may use at least one of metadata that indicates where a failure occurs, metadata that indicates a type and/or severity of an event, and metadata that indicates how long it takes to perform service for the given event, or any combination thereof.

In some cases, the present systems and methods may maintain an ordered list of service actions. In some cases, the present systems and methods may maintain the ordered list based at least in part on metadata associated with service events. In some cases, the present systems and methods may maintain the ordered list in relation to a next scheduled service window. In some cases, the present systems and methods may optimize an efficiency of performing service actions during a given service window based on optimization of which service actions are assigned to a service window and an order of the service windows to be performed during the service window. In some cases, the present systems and methods may use algorithms developed to solve the prize collecting travelling salesman problem in relation to time windows. In some cases, the efficiency of service may be defined as a multi-goal optimization where the number of service operations is balanced against the severity of events.

In some cases, the present systems and methods may employ an indoor positioning system (IPS) in relation to performing service actions. In some cases, the IPS may be enable a technician to more easily locate a next service action during a service window. In one embodiment, one or more storage units may be equipped with an IPS locator and/or a global positioning system (GPS) locator. In some cases, the present systems and methods may enable a service person to use a handheld devices such as a tablet or smartphone that guides the service person to each affected storage unit scheduled for a service action during the service window. In some cases, the present systems and methods may provide service action location guidance based on inertial measurements relative to a device of the service person and the affected storage unit. A storage unit may include at least one of a storage drive, a storage server, a storage rack, a storage enclosure, and a storage facility, or any combination thereof.

In some cases, a location of a storage device may be based on a local positioning system (LPS). In some embodiments, LPS may be based at least in part on calculating a triangulation of LPS signals. Additionally or alternatively, LPS may be based at least in part on trilateration calculations or determining absolute or relative locations of points by measurement of distances using the geometry of circles, spheres and/or triangles in relation to LPS signals. Additionally, or alternatively, LPS may be based at least in part on multilateration calculations.

In some cases, multilateration may include a measurement of the difference in distance to two signal sources (e.g., LPS signal generators) at known locations by detecting signals at known times. In some cases, measuring the difference in distance between the two signal sources may result in an infinite number of locations that satisfy the measurement. When these possible locations are plotted, the possible locations form a hyperbolic curve. To locate the location of the measuring device along that curve, multilateration relies on multiple measurements: a second measurement of a pair of signal sources, where at least one of the pair is different from the first pair of signal sources, produces a second curve, which intersects with the first curve (e.g., measure signal sources A and B in the first measurement, and measure signal sources B and C, or C and D, in the second measurement, etc.). When the two curves are compared, a small number of possible locations are revealed. In some cases, the location may be based on the first and second measurements. In some cases, the location may be based on three or more measurements.

In some cases, the location of the storage device may be based on a hybrid positioning system. In one example, a hybrid positioning system may determine a location based on using several different positioning technologies. For example, the location of the storage device may be based on at least one of a global positioning system (GPS), a cell tower signal, a wireless network or Wi-Fi signal, a Bluetooth signal, an associated IP address, and network environment data, or any combination thereof.

In some cases, the location of the storage device may be based on an indoor positioning system (IPS). IPS may be based on at least one of distance measurements to a WiFi access point, distance measurement to IPS nodes (e.g., IPS nodes with known positions), magnetic positioning, dead reckoning, radio waves, magnetic fields, optical signals, acoustic signals, or any combination thereof.

In some cases, the location of the storage device may be based on real-time locating systems (RTLS). In some embodiments, a wireless RTLS tag may be attached to a storage device to automatically identify and track the location of the storage device in real time. In some cases, an RTLS tag may be based on at least one of radio frequency (RF) signals, optical or infrared signals, and acoustic or ultrasound signals, or any combination thereof. In some examples, the RTLS tag may include a transmitter, receiver, or both.

As an example, a service event may occur in relation to an affected storage system. In some cases, the service event may be uniquely associated with a system identifier associated with the affected storage system. For example, the service event may be tied to an affected system uniquely identified by a system serial number. In some cases, the affected system may be equipped with a locator beacon to increase the efficiency of a service person locating the affected storage system to perform an associated service action.

In some cases, a service action of the service event may be added to a list of pending service actions. In some cases, the list of pending service actions may be optimized and/or ranked based on the aspects of each service action in the list of pending service actions. In some cases, one or more of the pending service actions may be assigned to a service window. In some cases, one or more aspects of the service actions assigned to the service window may be optimized such as the order of service actions assigned to the service window. In some cases, the list of pending service actions and/or a list of the service actions assigned to the service window may be re-optimized when a new service action is added to either list. In some cases, the list of the service actions assigned to the service window may be re-optimized when one or more aspects of the service window are updated such as a duration of the service window. In one embodiment, the present systems and methods may include providing guidance to a service person in relation to service actions assigned to a service window. For example, the present systems and methods may guide the service person from a location of a first service action to a location of a second service action. In some cases, this guidance may be based on IPS and/or GPS systems associated with storage systems associated with the service actions.

In some cases, the list of service actions assigned to a service window may be optimized based at least in part on an algorithm based on the traveling salesman problem (TSP). Given a list of service events and the distances between each pair of service event locations, the present systems and methods may find the shortest possible route that visits each service action location exactly once. Accordingly, the present systems and methods may produce a service schedule that reduces service time and, in turn, minimizes service cost.

In some cases, the present systems and methods may consider at least one of time limits associated with the service window and/or one or more service actions assigned to the service window, severity levels for one or more service actions assigned to the service window, possible event oversubscription when a schedule cannot fit all service events, or any combination thereof. In some cases, the present systems and methods may perform a prize collecting TSP with time windows to optimize the service window.

In some cases, the present systems and methods may configure service windows to be adaptive to possible dynamic changes such as changes that occur after a service window was created. For example, the present systems and methods may update a service window based at least in part on one or more of changing time windows, changing severity levels for at least some service actions assigned to the service window, adding new service actions to the service window, or any combination thereof.

In some cases, the present systems and methods may use one or more multi-goal mixed-integer mathematical programming formulations to implement the prize collecting TSP with time windows to optimize the service window. In one example, n service events may be supposed. In this example, i may represent a service event identification number where i changes from 1 to n. Then, $b_i$ may represent the beginning of time window for service event i,
$e_i$ may represent the end of time window for service event i,
$d_i$ may represent the duration time of service event i,
$w_i$ may represent the value of performing service event i based on its severity,
$s_{ij}$ may represent the distance between event i and event j converted in time units,
$t_i$ may represent the start time of service event i,
$x_i$ may indicate that service event i is scheduled when $x_i=1$; while $x_i=0$ indicates that service event i is not scheduled, and
$y_{ij}$ may indicate service event i precedes service event j when $y_{ij}=1$; while $y_{ij}=0$ indicates service event i does not precede service event j.

Accordingly, equation 1, included below, may calculate a maximum number of service actions that may be scheduled during a given service window. In some cases, equation 1 may calculate the maximum number of service actions based at least in part on a severity level of each service action, where preference is given to service actions with higher severity levels according to equation 1. In one embodiment, the higher the severity, the larger the value of $w_i$.

$$\max \sum_i w_i x_i \qquad \text{Eq. 1}$$

Similarly, equation 2, included below, may calculate a minimum time spent traveling between service actions locations for those service actions assigned to a given service window.

$$\min \sum_i t_i x_i \qquad \text{Eq. 2}$$

$$\text{subject to} \quad \begin{aligned} & b_i \leq t_i \leq e_i - d_i && \text{for all } i \\ & t_i + d_i + s_{ij} \leq t_j && \text{if } x_i = x_j = y_{ij} = 1, i \neq j \\ & y_{ij} + y_{ji} = 1 && i \neq j \\ & x_i, y_{ij} \in \{0, 1\} && \text{for all } i, j \end{aligned}$$

In one embodiment, as indicated above, a first constraint ensures that the scheduled service event is performed within a specific service window of a given duration. In some cases, a second constraint ensures that there is no resource conflict between any two scheduled service events. The second constraint may specify that a service action cannot be scheduled before a previous service action is finished during the given service window. In some cases, a third constraint specifies that the order of service action assigned to a service window is defined.

FIG. 1 is a block diagram illustrating one embodiment of an environment 100 in which the present systems and methods may be implemented. The environment may include device 105 and storage media 110. The storage media 110 may include any combination of hard disk drives, solid state drives, and hybrid drives that include both hard disk and solid state drives. In some embodiments, the storage media 110 may include shingled magnetic recording (SMR) storage drives. In some embodiments, the systems and methods described herein may be performed on a single device such as device 105. In some cases, the methods described herein may be performed on multiple storage devices or a network of storage devices such a cloud storage system and/or a distributed storage system. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include service action module 130. In one example, the device 105 may be coupled to storage media 110. In some embodiments, device 105 and storage media 110 may be components of flash memory or a solid state drive. Alternatively, device 105 may be a component of a host of the storage media 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may be an example of and/or include a network device such as a switch, router, access point, gateway, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage media 110 may include a database. Additionally, or alternatively, the database may include a network connection to a remote database communicatively coupled wired and/or a wireless to a local database. Additionally, as described in further detail herein, software and/or firmware (for example, stored in memory) may be executed on a processor of device 105. Such software and/or firmware executed on the processor may be operable to cause the device 105 to monitor, process, analyze, summarize, present, receive, and/or send information associated with the operations described herein.

In some embodiments, storage media 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage media 110 may be internal to device 105. As one example, device 105 may include a storage controller that interfaces with storage media of storage media 110. Service action module 130 may detect a storage device related event such as an event that affects the operation of a storage device. In some cases, service action module 130 may detect events that adversely affect the operation of local and/or remote storage devices. In some embodiments, service action module 130 may store the detected event in a log that includes multiple detected events. The log may include detected events from a single storage device or events from two or more storage devices. In some embodiments, service action module 130 may create one or more service actions based on the identified events. In some cases, service action module 130 may create a service action for a detected event in relation to a scheduled service window. For example, service action module 130 may generate a service action based on detecting a service event of a storage device that indicates a condition of the storage device adversely affects an operation of the storage device. Service action module 130 may generate a service action to remedy the adverse condition indicated by the service event and schedule the service action to be performed during a next scheduled service window and/or a subsequent service window.

Figure 2:
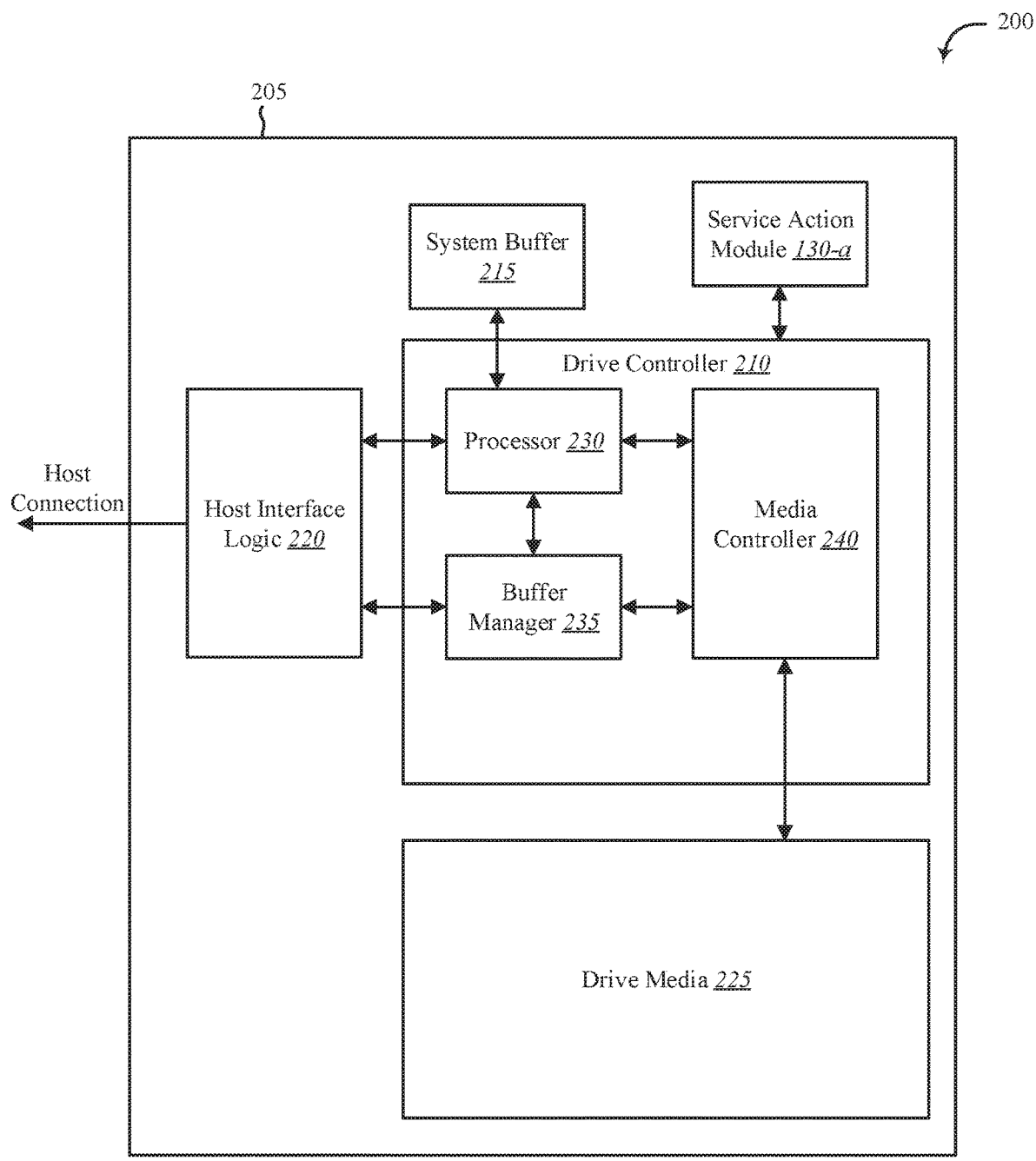
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, and service action module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The drive controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215.

Although depicted outside of drive controller 210, in some embodiments, service action module 130-a may include software, firmware, and/or hardware located within drive controller 210. For example, service action module 130-a may include at least a portions of processor 230, buffer manager 235, and/or media controller 240. In one example, service action module 130-a may include one or more instructions executed by processor 230, buffer manager 235, and/or media controller 240.

Figure 3:
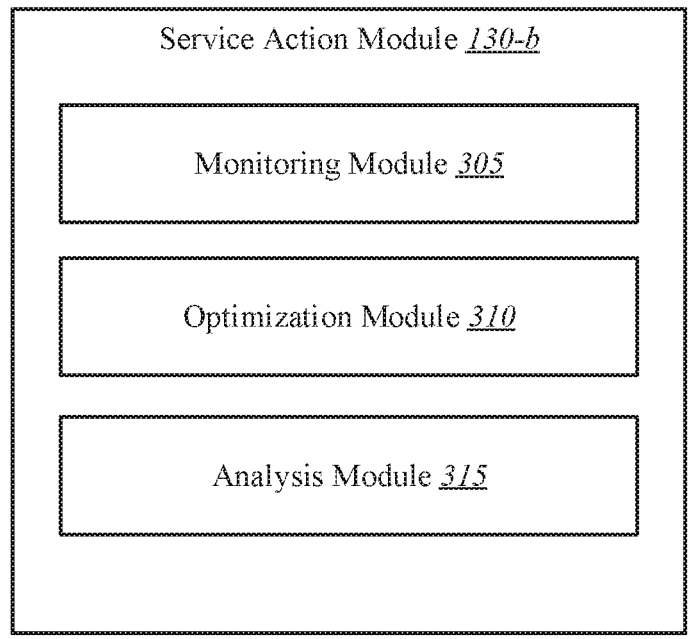
FIG. 3 shows a block diagram of one or more modules in accordance with various aspects of this disclosure.

FIG. 3 shows a block diagram of service action module 130-b. The service action module 130-b may include one or more processors, memory, and/or one or more storage devices. The service action module 130-b may include monitoring module 305, optimization module 310, and analysis module 315. The service action module 130-b may be one example of service action module 130 of FIGS. 1 and/or 2. Each of these components may be in communication with each other. In some examples, service action module 130-b may include or operate in conjunction with one or more processors and memory in electronic communication with the one or more processors. In some cases, service action module 130-b may include computer executable instructions that when executed by the processor cause the processor to perform certain operations as explained herein. In one embodiment, service action module 130-b may perform one or more operations in conjunction with one or more storage systems and/or one or more processors from one or more computing devices. In some cases, service action module 130-b may perform the operations described herein to improve efficiency of performing service actions for one or more storage systems. In some cases, the one or more storage systems may each include at least one of a storage drive, a storage controller, a storage enclosure including one or more storage drives, a storage server, a storage expansion bus, a storage expansion card, one or more storage system processors, storage system memory, a storage system power supply, and a storage cooling system, or any combination thereof.

In one embodiment, monitoring module 305 may be configured to detect a service event on a storage system. In some cases, monitoring module 305 may detect a service event based at least in part on monitoring module 305 monitoring events on one or more storage systems. In some cases, a storage system may generate a service event. In some embodiments, a service event may include an event that indicates a condition of an associated storage system. In some cases, a service event may indicate an operating condition of the storage system is adversely affected. In some cases, the service event may be based at least in part on one or more of an abnormal operation of at least one of the one or more storage systems, an abnormal operating condition of at least one of the one or more storage systems, a hardware failure, a software bug, a firmware bug, unavailability of at least one of the one or more storage systems, a loss of data stored on at least one of the one or more storage systems, or any combination thereof.

In some embodiments, optimization module 310 may be configured to create a service action based at least in part on detecting the service event. In some examples, a service event may suggest one or more service actions to remedy an associated adverse condition of the storage system. Additionally or alternatively, analysis module 315 may analyze a service event and generate a service action based at least in part on the analysis.

In some embodiments, optimization module 310 may be configured to add a service action to a list of pending service actions associated with the one or more storage systems. In some cases, each service event in the list of pending service events may represent an adverse condition awaiting repair in relation to one or more storage systems. For example, the list of pending service events may include one or more service events associated with a first storage system, one or more service events associated with a second storage system different and/or separate from the first storage system, and so on.

In some embodiments, monitoring module 305 may track a schedule of service windows. In some cases, a scheduled service window may indicate at least one of a specified block of time allocated for performing service actions, one or more locations associated with the schedule service window such as a physical address of a storage facility or datacenter, a list of service actions to be performed during the service window, a location of affected storage systems, or any combination thereof. Additionally or alternatively, a scheduled service window may indicate a date for the service window such as at least one of a month, a day of the week, a day of the month, a year, or any combination thereof.

In some embodiments, optimization module 310 may be configured to assign one or more service actions from the list of pending service actions to a next scheduled service window based at least in part on a ranking of the service actions in the list of pending service actions. Additionally or alternatively, optimization module 310 may be configured to assign one or more service actions from the list of pending service actions to a next scheduled service window based at least in part on one or more predetermined criteria of the service window. Examples of predetermined criteria of the service window may include at least one of duration of the service window, service action types allowed to be assigned to the service window, a location assigned to the service window, or any combination thereof.

In one embodiment, analysis module 315 may be configured to analyze one or more aspects of at least one of a service event, a storage device associated with the service event, a service action, a service window associated with the service action, or any combination thereof. In some cases, analysis module 315 may be configured to analyze one or more aspects of service actions in the list of pending service actions.

In some embodiments, analysis module 315 may be configured to rank each service action in the list of pending service actions according to one or more service action criteria. In some cases, the one or more service action criteria may include at least one of event type, event severity, storage system identifier, event location, number of service actions in the list of pending service actions, service action duration, service window duration, and a distance between an event location of a first service action assigned to the service window and an event location of a second service action assigned to the service window, or any combination thereof. In some embodiments, optimization module 310 may be configured to select which service actions to assign to the service window based at least in part on the ranking of each service action in the list of pending service actions according to the one or more service action criteria.

In some embodiments, analysis module 315 may be configured to determine an optimized order in which to perform the one or more service actions assigned to the service window. In some cases, analysis module 315 may determine an optimized order based at least in part on at least one of one or more aspects of the service actions assigned to the service window, one or more aspects of the service window, and one or more aspects of the affected storage systems, or any combination thereof. In some cases, aspects of affected storage systems may include at least one of model and/or type of storage enclosure, model and/or type of storage drive (e.g., hard disk, solid state, hybrid, shingled magnetic recording, etc.), or any combination thereof.

In some cases, the event location may include at least one of a location of a storage system affected by the service event, a location of a component of the storage system affected by the service event, a location of a facility housing the affected storage system, or any combination thereof. In some cases, the service window duration may be based at least in part on the service action duration of each service action assigned to the service window. In some cases, the service action duration of the service event may be based at least in part on an estimated time to perform a repair on the storage system associated with the service event. In some cases, the service action duration includes an estimation of how long it takes to perform an associated service action. In some cases, the service action duration may be based at least in part on computational modeling of service action durations for one or more particular service actions. Additionally or alternatively, the service action duration may be based at least in part on computational analysis of a history of service action durations for actual service actions performed.

In some cases, analysis module 315 may analyze an effect of adjusting one or more aspects of a service window in relation to the one or more aspects of the service window and/or service actions assigned to the service window. In one embodiment, analysis module 315 may be configured to calculate an allotted time for the service window based at least in part on a selection of one or more service actions to accomplish during the service window. For example, one or more aspects of a service window may be adjusted based on which service actions are assigned to the service window. As one example, both a first service action with a duration of 30 minutes and a second service action with a duration of 60 minutes may be added to a service window with a duration of 60 minutes. Accordingly, analysis module 315 may identify that the combination of the first and second service actions exceeds the duration of the service window by 30 minutes. Accordingly, optimization module 310 may adjust the duration of the service window to 90 minutes to accommodate the first and second service actions during the service window.

In some embodiments, optimization module 310 may be configured to adjust one or more aspects of the service window based at least in part on analysis performed by the analysis module 315. For example, optimization module 310 may be configured to adjust one or more aspects of the service window based at least in part on an affect associated with at least one of adding of the service action to the list of pending service actions, assigning of the one or more service actions from the list of pending service actions to the service window, and ranking of each service action in the list of pending service actions according to the one or more service action criteria, or any combination thereof.

In some cases, adjusting the one or more aspects of the service window includes at least one of adjusting an allotted time associated with the service window, adjusting one or more service actions assigned to the service window, adjusting an order of the one or more service actions assigned to the service window, adjusting a route associated with the one or more service actions assigned to the service window, adding a service action to the one or more service actions assigned to the service window, removing a service action from the one or more service actions assigned to the service window, changing a duration of a service action assigned to the service window, changing a start time of a service action assigned to the service window, and changing an end time of a service action assigned to the service window, or any combination thereof.

In some embodiments, optimization module 310 may be configured to generate a service map. In some cases, the service map may depict an area as a two-dimensional map. Additionally or alternatively, the service map may depict a space as a three-dimensional map. In some cases, the service map may depict a location of each of the one or more storage systems relative to the at least one area and/or space.

In some embodiments, optimization module 310 may be configured to depict the event location of the service event on the service map. In some cases, the event location may be based at least in part on the location of a storage device associated with the service event. In some cases, a location of the service event is determined based on at least one of a global positioning system (GPS) associated with the affected storage system, an indoor positioning system (IPS), and a local positioning system (LPS) associated with the affected storage system, or any combination thereof.

In some cases, one or more components of each of the one or more storage systems may include a location beacon. For example, one or more storage enclosures among several storage enclosures in a datacenter may include a location beacon. As one example when a storage drive of one of the storage enclosures fails, the failure may trigger a service event. In one embodiment, at least one of a serial number and relative location of the affected storage enclosure may be associated with the service event. Additionally or alternatively, GPS coordinates and/or LPS coordinates of the affected storage enclosure may be associated with the service event. Additionally or alternatively, a location of the affected storage enclosure relative to the multiple storage enclosures may be associated with the service event.

In some embodiments, optimization module 310 may be configured to provide guidance from a location of a first service action to a location of a second service action based at least in part on displaying the service map on a display of the computing device. In some cases, the provided guidance may include audio guidance (e.g., text to speech guidance), or graphical guidance, or both. In some cases, the first service action and the second service action may be different and/or separate service actions assigned to the service window. In one embodiments, guidance may be provided to two or more persons performing the service actions to enable the service actions to be performed concurrently by the two or more persons. For example, service person A and service person B may be at a storage facility to perform two or more service actions. Optimization module 310 may provide guidance to service person A to perform service action X and concurrently provide guidance to service person B to perform service action Y. Optimization module 310 may then provide guidance to one or more additional service actions at the storage facility depending on at least one of the location of the service action, the location of either service person, when service person A finishes service action X, when service person B finishes service action Y, a certification level of service person A relative to a service action, a certification level of person B relative to a service action, or any combination thereof.

Figure 4:
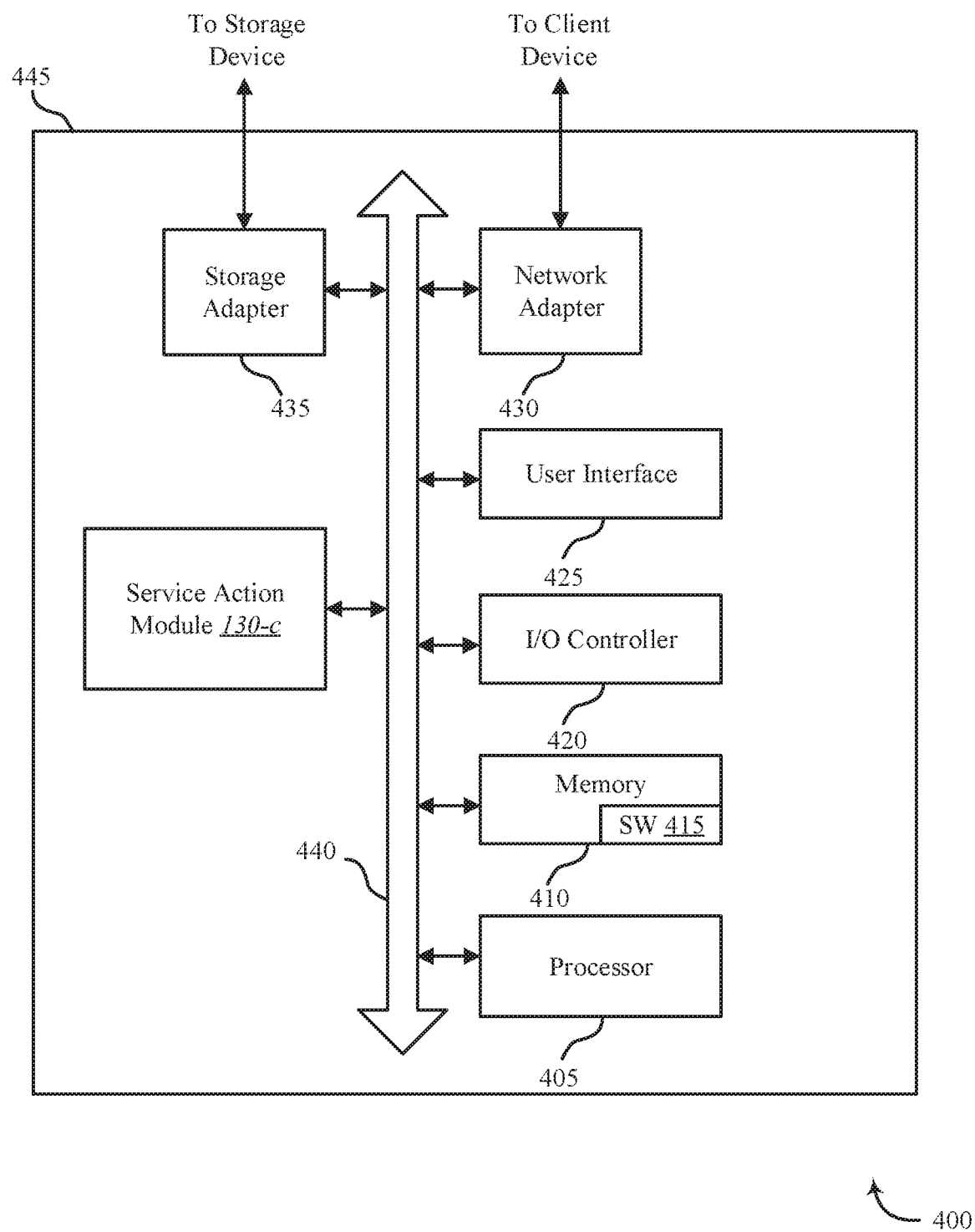
FIG. 4 shows a diagram of a system in accordance with various aspects of this disclosure.

FIG. 4 shows a system 400 for improving efficiency in performing service actions for one or more storage systems, in accordance with various examples. System 400 may include an apparatus 445, which may be an example of any one of device 105 of FIG. 1 and/or apparatus 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (apparatus 445 communicating directly with a storage system, for example) and/or indirect (apparatus 445 communicating indirectly with a client device through a server, for example).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include service action module 130-c, which may perform the functions described above for the service action module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 445 such as processor module 405, memory 410, I/O controller module 420, user interface module 425, network adapter 430, and storage adapter 435, or any combination thereof.

The memory 410 may include random access memory (RAM), read only memory (ROM), flash memory, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (when compiled and executed, for example) to perform functions described herein. Alternatively, the computer-readable, computer-executable software/firmware code 415 may not be directly executable by the processor module 405, but may be configured to cause a computer, when compiled and executed, to perform functions described herein. The processor module 405 may include an intelligent hardware device, for example, a central processing unit (CPU), a microcontroller, an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the service action module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to and/or included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices such as device 105 of FIG. 1, and/or other devices over a communication network. Network adapter 430 may provide wired and/or wireless network connections. In some cases, network adapter 430 may include an Ethernet adapter or Fibre Channel adapter. Storage adapter 435 may enable apparatus 445 to access one or more data storage devices such as storage media 110. The one or more data storage devices may include two or more data tiers each. The storage adapter 435 may include one or more of an Ethernet adapter, a Fibre Channel adapter, Fibre Channel Protocol (FCP) adapter, a SCSI adapter, and iSCSI protocol adapter.

Figure 5:
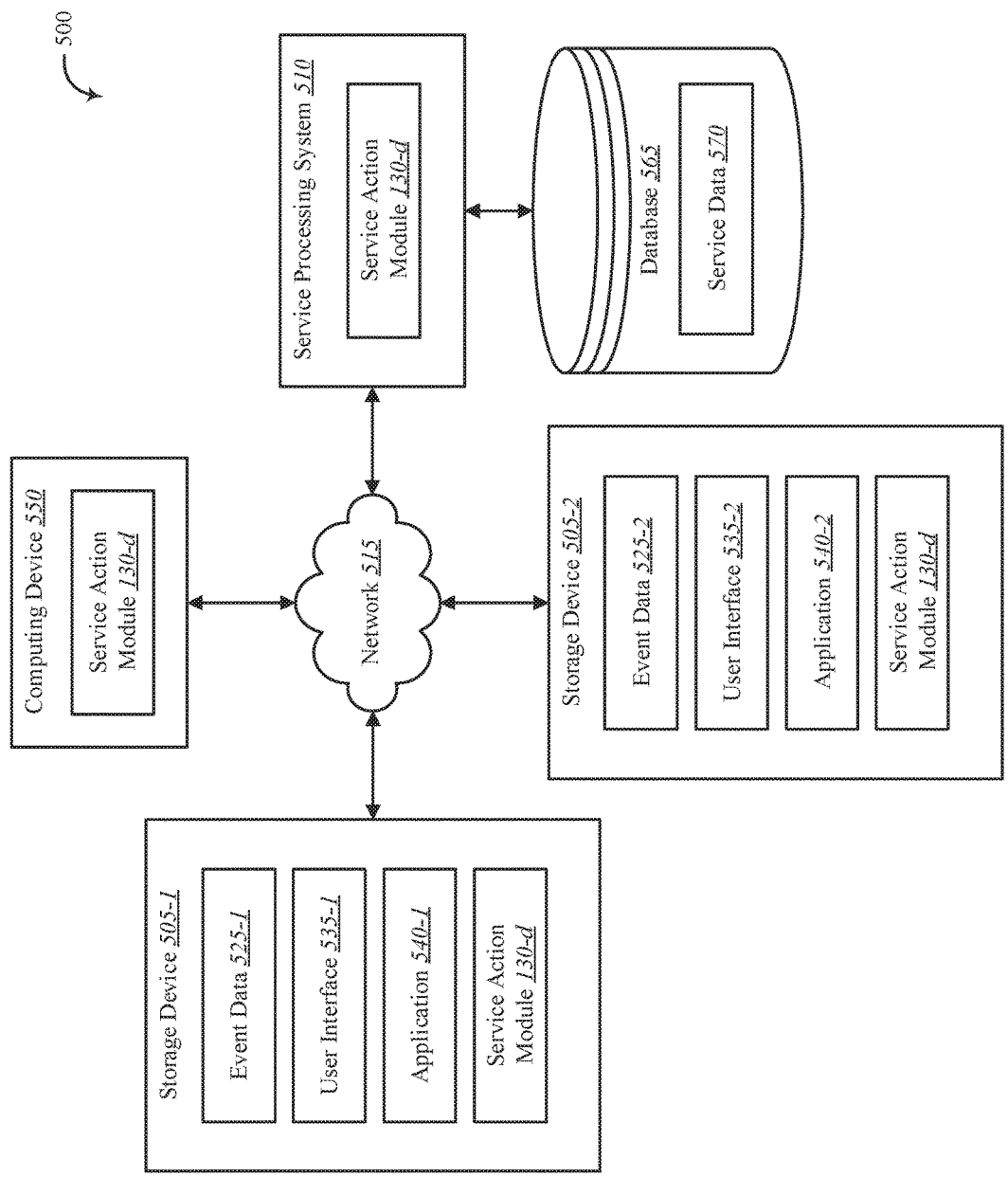
FIG. 5 shows a diagram of a system in accordance with various aspects of this disclosure.

FIG. 5 shows a diagram of a system 500 for improving efficiency in performing service actions for one or more storage systems, in accordance with various examples. At least one aspect of system 500 may be implemented in conjunction with device 105 of FIG. 1, apparatus 205 of FIG. 2, and/or service action module 130 depicted in FIGS. 1, 2, 3, and/or 4.

In some embodiments, the systems and methods described herein may be performed on a device (e.g., storage device 505-1 and/or storage device 505-2). As depicted, the system 500 may include storage device 505-1, storage device 505-2, service processing system 510, a computing device 550, and a network 515 that allows the storage device 505-1, storage device 505-2, service processing system 510, and computing device 550 to communicate with one another.

Reference to storage device 505 may refer to storage device 505-1 alone, storage device 505-2 alone, or both storage device 505-1 and storage device 505-2. Examples of the storage device 505 may include a storage enclosure containing two or more storage drives, a storage server, a distributed storage device, a cloud storage device, or any combination thereof. In some embodiments, storage device 505 may include one or more storage mediums. Storage device 505 may include any number of hard disk drives, solid state drives, hybrid drives with a mix of hard disk storage media and solid state storage media, or any combination thereof. Storage device 505 may include storage drives internal or external to storage device 505 or a combination thereof. In some embodiments, storage device 505-1 is a storage device located in the same physical space or area as storage device 505-2. For example, storage device 505-1 and storage device 505-2 may be two separate storage devices in the same datacenter. Alternatively, storage device 505-1 may be remote to storage device 505-2. For example, storage device 505-1 may be located at a first datacenter and storage device 505-2 may be located at a second datacenter remote to the first datacenter.

In some configurations, storage device 505-1 may include event data 525-1, user interface 535-1, application 540-1, and service action module 130-d. Similarly, storage device 505-2 may include event data 525-2, user interface 535-2, application 540-2, and service action module 130-d. Although the components of the storage device 505 are depicted as being internal to the storage device 505, it is understood that one or more of the components may be external to the storage device 505 and connect to storage device 505 through wired and/or wireless connections. In some embodiments, application 540 may be installed on computing device 550 in order to enable a remote machine such as computing device 550 to interface with user interface 535-1 and/or a function of storage device 505-1, with user interface 535-2 and/or a function of storage device 505-2 service action module 130-d, and/or service processing system 510.

In one embodiment, storage device 505-1 may generate event data 525-1 each time storage device 505-1 determines a predetermined storage event occurs. Similarly, storage device 505-2 may generate event data 525-2 each time storage device 505-2 determines a predetermined storage event occurs. In some embodiments, storage device 505-1 may process at least a portion of event data 525-1 and/or storage device 505-2 may process at least a portion of event data 525-2. In some cases, storage device 505-1 may send over network 515 event data 525-1 to service processing system 510 to enable service processing system 510 to process at least a portion of event data 525-1. Similarly, storage device 505-2 may send over network 515 event data 525-2 to service processing system 510 to enable service processing system 510 to process at least a portion of event data 525-2. Although system 500 depicts event data 525 from two storage devices 505, it is understood that event data may be generated by any number of storage systems. Thus, service processing system 510 may receive event data from one storage device and/or additional event data from two or more storage devices such as storage devices 505-1 and 505-2.

In some cases, one or more functions of storage device 505 and/or service processing system 510 may be invoked by computing device 550. Examples of computing device 550 may include any combination of a mobile computing device, a laptop, a desktop, a server, a media set top box, or any combination thereof.

In some embodiments, storage device 505 may communicate with service processing system 510 via network 515. Examples of service processing system 510 may include any combination of a mobile computing device, a laptop computer, a desktop computer, a data server, a cloud server, proxy server, mail server, web server, application server, database server, communications server, file server, home server, mobile server, name server, or any combination thereof. Examples of network 515 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 515 may include the Internet.

In some embodiments, storage device 505-1, storage device 505-2, computing device 550, and/or service processing system 510 may include service action module 130-d where at least a portion of the functions of service action module 130-d are performed separately and/or concurrently on storage device 505-1, storage device 505-2, computing device 550, and/or service processing system 510. Likewise, in some embodiments, a user may access the functions of storage device 505-1 and/or storage device 505-2 from computing device 550. For example, in some embodiments, computing device 550 includes a mobile application that interfaces with one or more functions of storage device 505, service action module 130-d, and/or service processing system 510.

In one embodiment, service processing system 510 may identify one or more service events in event data 525-1 that affect the operation of storage device 505-1 such as adverse conditions, errors, or failures associated with storage device 505-1 and/or a storage drive of storage device 505-1. Similarly, service processing system 510 may identify one or more service events in event data 525-2 that affect the operation of storage device 505-2 such as adverse conditions, errors, or failures associated with storage device 505-2 and/or a storage drive of storage device 505-2. In some embodiments, service processing system 510, in conjunction with service action module 130-d, may analyze the service events in event data 525-1 and/or event data 525-2 and generate one or more service actions based on this analysis.

In some cases, service processing system 510 may send a generated service action to computing device 550 over network 515. For example, computing device 550 may receive a service action from service processing system 510 and implement the received service action to remedy an issue affecting an operation of storage device 505-1 as determined by analysis of event data 525-1. Similarly, computing device 550 may receive a service action from service processing system 510 and implement the received service action to remedy an issue affecting an operation of storage device 505-2 as determined by analysis of event data 525-2.

In some embodiments, service processing system 510 may be coupled to database 565. Database 565 may include service data 570. Database 565 may be internal or external to the service processing system 510. In some cases, storage device 505 and/or computing device 550 may access service data 570 in database 565 over network 515 via service processing system 510. In one example, storage device 505 and/or computing device 550 may be coupled directly to database 565, database 565 being internal or external to storage device 505 and/or computing device 550. In some embodiments, at least a portion of service data 570 may be generated based on event data 525. In some cases, service data 570 may include telemetry event data from one or more storage devices including storage device 505. Additionally, or alternatively, service data 570 may include a list of service events. For example, event data 525 may include some events that indicate storage device 505-1 and/or storage device 505-2 may be operating abnormally. Such events may be referred to as service events or events that indicate service ought to be performed.

Figure 6:
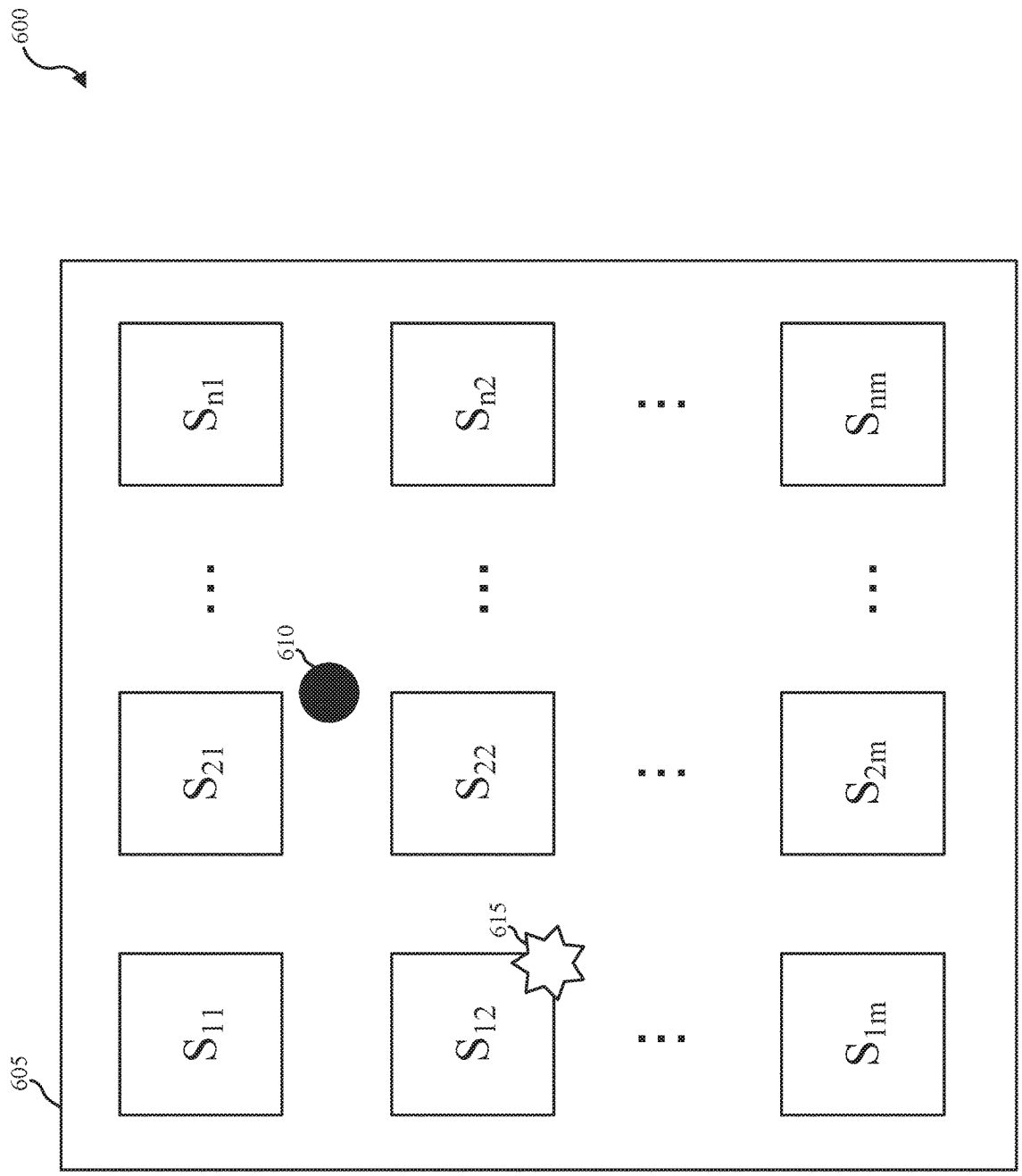
FIG. 6 shows a diagram of an environment in accordance with various aspects of this disclosure.

FIG. 6 shows a diagram of an environment 600 in accordance with various aspects of this disclosure. At least one aspect of environment 600 may be derived from and/or implemented in conjunction with device 105 of FIG. 1, apparatus 205 of FIG. 2, and/or service action module 130 depicted in FIGS. 1, 2, 3, 4, and/or 5. In some cases, environment 600 may include any combination of components from FIGS. 1-5.

As depicted, environment 600 may include a service map 605. As depicted, service map 605 may include a two-dimensional map. Additionally or alternatively, the service map 605 may depict a space as a three-dimensional map. In some cases, the service map may depict a location of each of the one or more storage devices relative to the at least one area and/or space. For example, service map 605 may depict storage devices in a datacenter. As one example, service map 605 may display one area or section of a datacenter. For instance, service map 605 may depict an area, section, or floor of a datacenter.

As depicted, the depicted area of service map 605 may include a first row of storage devices S11 to Sn1, a second row of storage devices S12 to Sn2, up to an $m^{th}$ row of storage devices S1m to Snm. Examples of the depicted storage devices may include at least one of a storage drive, a storage controller, a storage enclosure including one or more storage drives, a storage server, cloud storage systems, distributed data storage system, a storage expansion bus, a storage expansion card, one or more storage system processors, storage system memory, a storage system power supply, and a storage cooling system, or any combination thereof.

As shown, service map 605 may depict a location of a service person 610 performing service actions in relation to the depicted storage devices. For example, service person 610 may carry a mobile computing device with location services that enable the present systems and methods to track a position of the service person relative to the indicated storage devices and/or service actions assigned to a given service window. In some embodiments, the present systems and methods may depict a location of a service action 615 on service map 605. As depicted, service map 605 may depict a service action with relation to station S12. In some cases, service action 615 may be a location of a next service action. For example, service person 610 may be instructed to first work on station S21. When finished with station S21, service person 610 may be instructed to next work on station S12. In some cases, a location of service action 615 may be determined based on at least one of a global positioning system (GPS) associated with station S12, a local positioning system (LPS) associated with associated with station S12, or both.

In some cases, one or more of the storage devices depicted in service map 605 may include a location beacon. Additionally or alternatively, location beacons may be distributed over the area depicted in service map 605. In one embodiment, a serial number a storage device such as storage device S12 may be associated with a location beacon. Additionally or alternatively, GPS coordinates and/or LPS coordinates of storage device S12 may be associated with the location beacon. Accordingly, when S12 generates a service event, a service action for the service event may indicates at least one of a location of storage device S12, a serial number of storage device S12, information regarding an adverse condition of storage device S12, and information regarding a solution to remedy the adverse condition, or any combination thereof.

In some embodiments, service map 605 may provide guidance from a location of a first service action to a location of a second service action based at least in part on displaying the service map 605 on a display of a computing device carried by service person 610. In some cases, the provided guidance may include audio guidance (e.g., text to speech guidance), or graphical guidance (e.g., text directions depicted on service map 605, arrows depicted on service map 605, etc.). In some cases, the first service action and the second service action may be different and/or separate service actions assigned to the service window. In some cases, service map 605 may display information regarding a service event, a service action for the service event, information regarding an adverse condition of an affected storage device, information regarding a solution to remedy the adverse condition, a relative location of an affected storage device, and a serial number of an affected storage device, or any combination thereof.

Figure 7:
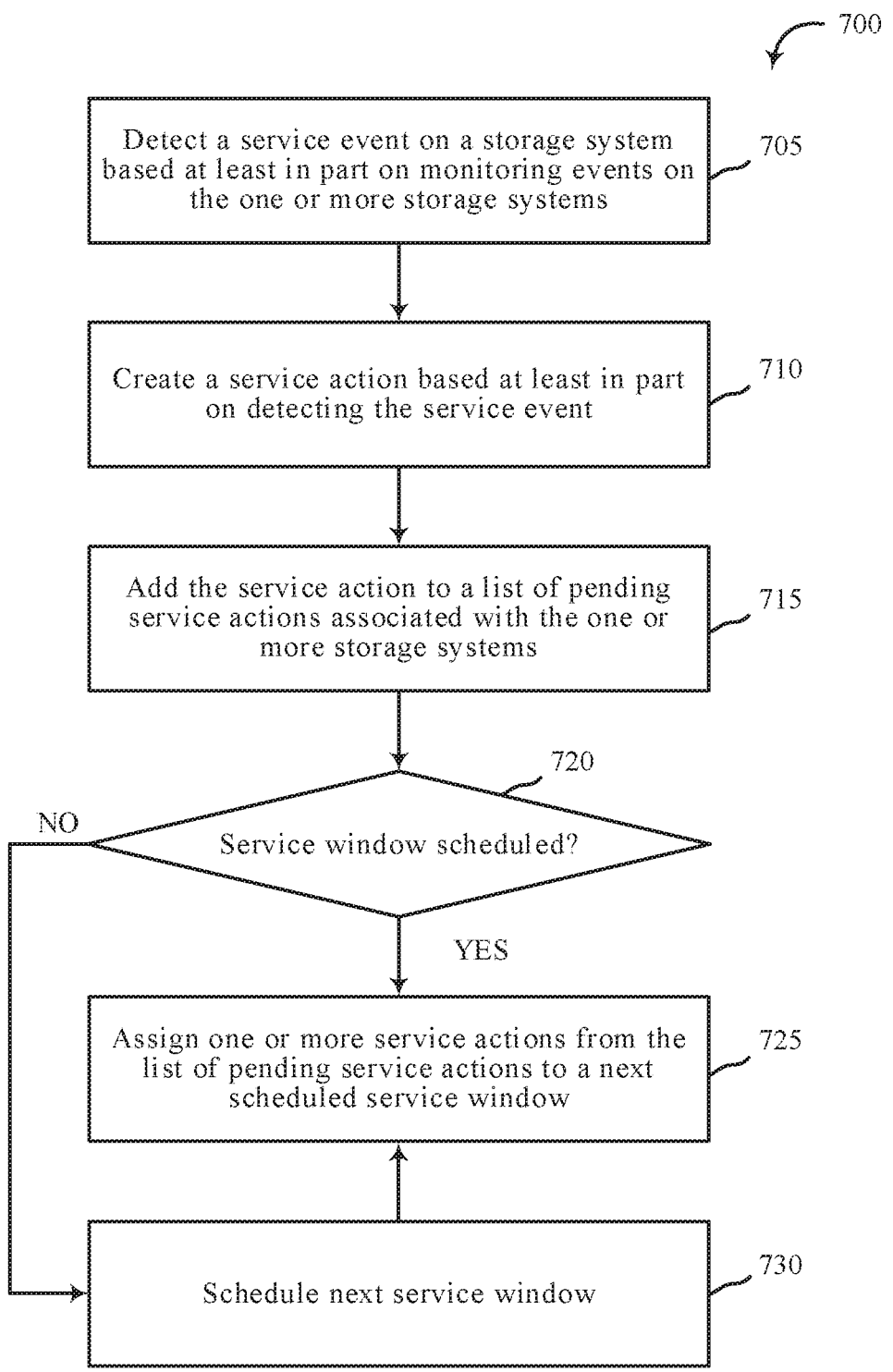
FIG. 7 is a flow chart illustrating an example of a method in accordance with various aspects of this disclosure.

FIG. 7 is a flow chart illustrating an example of a method 700 for improving efficiency in performing service actions for one or more storage systems, in accordance with various aspects of the present disclosure. One or more aspects of the method 700 may be implemented in conjunction with device 105 of FIG. 1, apparatus 205 of FIG. 2, and/or service action module 130 depicted in FIGS. 1, 2, 3, 4 and/or 5. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, method 700 may include detecting a service event on a storage system based at least in part on monitoring events on the one or more storage systems. At block 710, method 700 may include creating a service action based at least in part on detecting the service event. At block 715, method 700 may include adding the service action to a list of pending service actions associated with the one or more storage systems. In some cases, each service event in the list of service events may represent an adverse condition awaiting repair in relation to at least one of the one or more storage systems.

At block 720, method 700 may include determining whether a service window is scheduled. In one embodiment, when a next service window is not scheduled, at block 730 method 700 may schedule the next service window. In some cases, method 700 may schedule the next service window automatically, without human input. For example, method 700 may schedule the service window based at least in part on an identifying a calendar application associated with an administrator, identifying an availability of the administrator on the calendar application, implementing one or more scheduling criteria (e.g., schedule during a predetermined time of day, schedule during a predetermined day of the week, avoid holidays, etc.), or any combination thereof. Additionally or alternatively, method 700 may send a message to an administrator requesting the next service window be scheduled and/or suggest one or more aspects of scheduling the next service window.

Upon identifying the next scheduled service window, at block 725, method 700 may include assigning one or more service actions from the list of pending service actions to the next scheduled service window. In some cases, method 700 may assign the one or more service actions to the next scheduled service window based at least in part on at least one of a ranking of the one or more service actions (e.g., a ranking based on severity of event, etc.), a ranking of each service action in the list of pending service actions, and one or more aspects of the scheduled service window (e.g., length of the scheduled service window), or any combination thereof.

The operation(s) of method 700 shown in FIG. 7 may be performed using the service action module 130 described with reference to FIGS. 1-5 and/or another module. Thus, the method 700 may provide for improving efficiency in performing service actions for one or more storage systems. It should be noted that the method 700 is just one implementation and that the operations of the method 700 may be rearranged, omitted, and/or otherwise modified such that other implementations are possible and contemplated.

Figure 8:
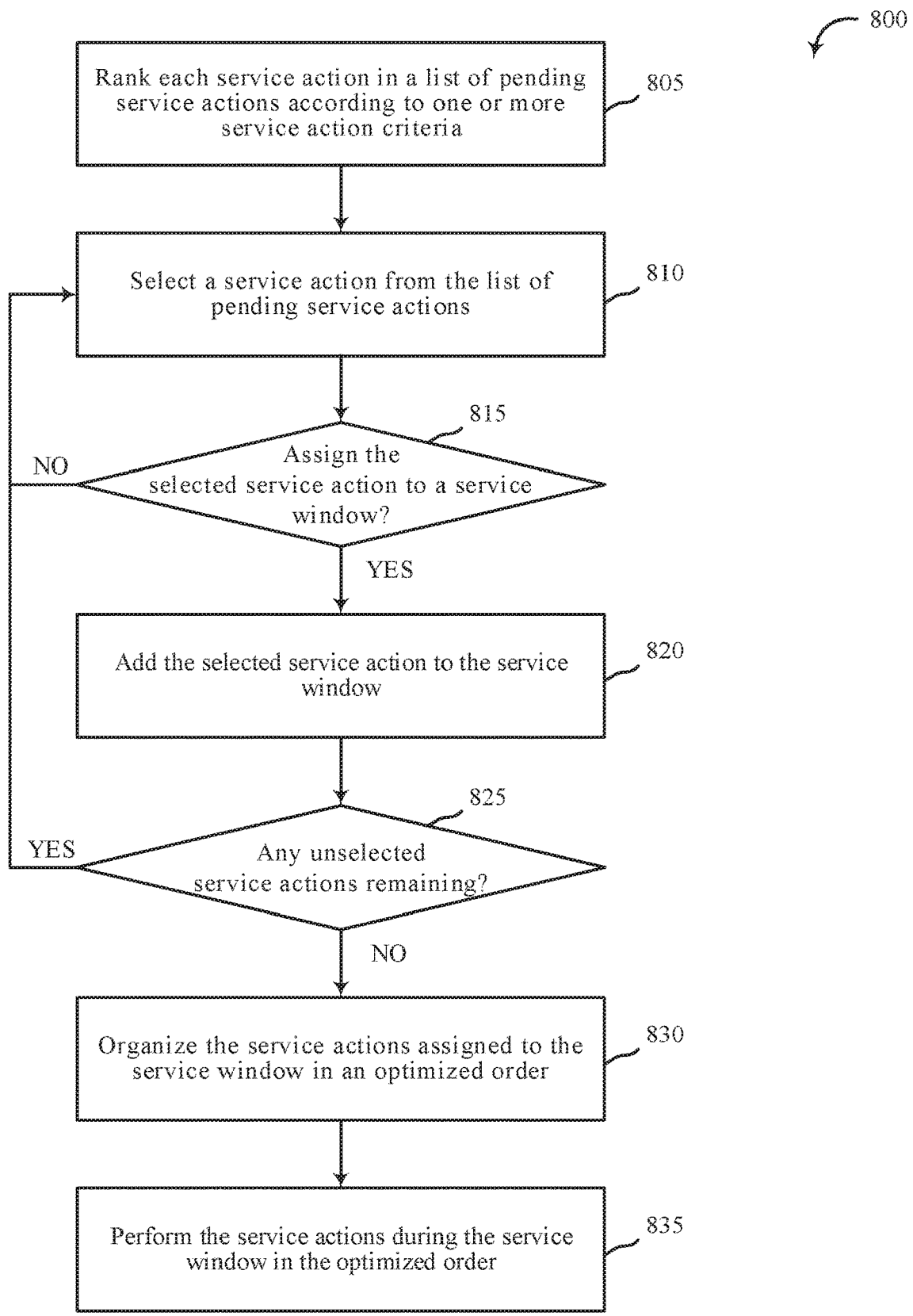
FIG. 8 is a flow chart illustrating an example of a method in accordance with various aspects of this disclosure.

FIG. 8 is a flow chart illustrating an example of a method 800 for improving efficiency in performing service actions for one or more storage systems, in accordance with various aspects of the present disclosure. One or more aspects of the method 800 may be implemented in conjunction with device 105 of FIG. 1, apparatus 205 of FIG. 2, and/or service action module 130 depicted in FIGS. 1, 2, 3, 4 and/or 5. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 805, method 800 may include ranking each service action in a list of pending service actions according to one or more service action criteria. In some cases, the one or more service action criteria may include at least one of event type, event severity, storage system identifier, event location, number of service actions in the list of pending service actions, service action duration, a service window duration, and a distance between an event location of a first service action and an event location of a second service action from the service actions assigned to the service window, or any combination thereof.

At block 810, method 800 may include selecting a service action from the list of pending service actions. At block 815, method 800 may include determining whether to assign the selected service action to the service window. In some cases, method 800 may assign a service action to the service window based at least in part on the ranking of the service action. Upon determining not to assign the selected service action to the service window, method 800 may return to block 810 to select a next service action in the list of pending service actions that has not been previously selected at block 810.

Upon determining to assign the selected service action to the service window, at block 820 method 800 may include adding the selected service action to the service window. At block 825, method 800 may include determining whether any unselected service actions remain in the list of pending service actions. Upon determining unselected service action remain, method 800 may return to block 810 to select a next service action in the list of pending service actions that has not been previously selected at block 810.

Upon determining no unselected service actions remain, at block 830, method 800 may include determining an optimized order in which to perform the one or more service actions assigned to the service window and organizing the service actions according to the optimized order. In some cases, method 800 may determine the optimized order based at least in part on one or more aspects of the service actions assigned to the service window. At block 835, method 800 may include performing the service actions during the service window in the optimized order.

The operation(s) of the method 800 shown in FIG. 8 may be performed using the service action module 130 described with reference to FIGS. 1-5 and/or another module. Thus, the method 800 may provide for improving efficiency in performing service actions for one or more storage systems. It should be noted that the method 800 is just one implementation and that the operations of the method 800 may be rearranged, omitted, and/or otherwise modified such that other implementations are possible and contemplated.

In some examples, aspects from two or more of the methods 700 and 800 may be combined and/or separated. It should be noted that the methods 700 and 800 are just example implementations, and that the operations of the methods 700 and 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein, but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A computing device to improve service action efficiency comprising:
   one or more processors;
   memory in electronic communication with the one or more processors, the memory storing computer executable instructions configured, executing the instructions by the one or more processors causing the one or more processors to:
   monitor events on one or more storage systems, wherein a first storage system from the one or more storage systems includes a first indoor positioning system (IPS) locator, and wherein a second storage system from the one or more storage systems includes a second IPS locator;
   detect a service event among the monitored events;
   create a service action for the detected service event;
   add the service action to a list of pending service actions associated with the one or more storage systems, each service action in the list of pending service actions representing an adverse condition awaiting repair in relation to at least one of the one or more storage systems;
   rank each service action in the list of pending service actions according to one or more service action criteria;
   assign one or more service actions from the list of pending service actions to a service window based at least in part on the ranking of the service actions in the list of pending service actions, wherein a first service action assigned to the service window is associated with the first storage system, and wherein a second service action assigned to the service window is associated with the second storage system;
   generate a service map associated with the one or more service actions assigned to the service window;
   determine a location of the first service action based on a location indicated by the first IPS locator of the first storage system;
   determine a location of the second service action based on a location indicated by the second IPS locator of the second storage system;
   depict on the service map the determined location of the first service action assigned to the service window, the determined location of the second service action assigned to the service window, and at least one area and a location in the at least one area of each of the one or more storage systems, wherein the one or more storage systems include at least one of a computing device with a storage device, a network device with a storage device, a storage server, a storage enclosure, a cloud storage system, and a distributed storage system, or any combination thereof; and
   provide guidance from the determined location of the first service action to the determined location of the second service action, wherein the guidance includes audio guidance or graphical guidance, or a combination of audio guidance and graphical guidance.

2. The computing device of claim 1, wherein the one or more service action criteria includes at least one of event type, event severity, storage system identifier, event location, number of service actions in the list of pending service actions, service action duration, service window duration, and a distance between an event location of a first service action assigned to the service window and an event location of a second service action assigned to the service window, or any combination thereof.

3. The computing device of claim 2, wherein the service action duration of the service event is based at least in part on an estimated time to perform a repair on the at least one storage system associated with the service event.

4. The computing device of claim 2, wherein the service window duration is based at least in part on the service action duration of each service action assigned to the service window.

5. The computing device of claim 1, wherein the instructions executed by the one or more processors cause the one or more processors to:
   adjust one or more aspects of the service window based at least in part on at least one of the adding of the service action to the list of pending service actions, the assigning of the one or more service actions from the list of pending service actions to the service window, and the ranking of each service action in the list of pending service actions according to the one or more service action criteria, or any combination thereof.

6. The computing device of claim 5, wherein adjusting the one or more aspects of the service window includes at least one of adjusting an allotted time associated with the service window, adjusting one or more service actions assigned to the service window, adjusting an order of the one or more service actions assigned to the service window, adjusting a route associated with the one or more service actions assigned to the service window, adding a service action to the one or more service actions assigned to the service window, removing a service action from the one or more service actions assigned to the service window, changing a duration of a service action assigned to the service window, changing a start time of a service action assigned to the service window, and changing an end time of a service action assigned to the service window, or any combination thereof.

7. The computing device of claim 6, wherein the instructions executed by the one or more processors cause the one or more processors to:
   select which service actions to assign to the service window based at least in part on the ranking of each service action in the list of pending service actions according to the one or more service action criteria; and
   determine an optimized order in which to perform the one or more service actions assigned to the service window based at least in part on one or more aspects of the service actions assigned to the service window.

8. The computing device of claim 1, wherein the instructions executed by the one or more processors cause the one or more processors to:
   display on a display associated with the computing device the location of the first service action or the location of the second service action, or both, on the service map, wherein the location of the first service action or the location of the second service action, or both, is further determined based on at least one of a global positioning system (GPS) associated with the at least one storage system, and a local positioning system (LPS) associated with at least one storage system, or any combination thereof.

9. The computing device of claim 1, wherein the instructions executed by the one or more processors cause the one or more processors to:
calculate an allotted time for the service window based at least in part on a selection of one or more service actions to accomplish during the service window.

10. A method to improve service action efficiency, comprising:
monitoring events on one or more storage systems, wherein a first storage system from the one or more storage systems includes a first indoor positioning system (IPS) locator, and wherein a second storage system from the one or more storage systems includes a second IPS locator;
detecting, by one or more processors, a service event among the monitored events;
creating, by the one or more processors, a service action for the detected service event;
adding, by the one or more processors, the service action to a list of pending service actions associated with the one or more storage systems, each service action in the list of pending service actions representing an adverse condition awaiting repair in relation to at least one of the one or more storage systems;
ranking each service action in the list of pending service actions according to one or more service action criteria;
assigning, by the one or more processors, one or more service actions from the list of pending service actions to a service window based at least in part on the ranking of the service actions in the list of pending service actions, wherein a first service action assigned to the service window is associated with the first storage system, and wherein a second service action assigned to the service window is associated with the second storage system;
determining a location of the first service action based on a location indicated by the first IPS locator of the first storage system;
determining a location of the second service action based on a location indicated by the second IPS locator of the second storage system;
using a positioning display system to depict the determined location of the first service action assigned to the service window in relation to the determined location of the second service action assigned to the service window, and at least one area and a location in the at least one area of each of the one or more storage systems, wherein the one or more storage systems include at least one of a computing device with a storage device, a network device with a storage device, a storage server, a storage enclosure, a cloud storage system, and a distributed storage system, or any combination thereof; and
providing guidance from the location of the first service action to the location of the second service action.

11. The method of claim 10, wherein the one or more service action criteria includes at least one of event type, event severity, storage system identifier, event location, number of service actions in the list of pending service actions, service action duration, service window duration, and a distance between an event location of a first service action assigned to the service window and an event location of a second service action assigned to the service window, or any combination thereof.

12. The method of claim 11, wherein the service action duration of the service event is based at least in part on an estimated time to perform a repair on the storage system associated with the service event.

13. The method of claim 11, wherein the service window duration is based at least in part on the service action duration of each service action assigned to the service window.

14. The method of claim 10, comprising:
adjusting one or more aspects of the service window based at least in part on at least one of the adding of the service action to the list of pending service actions, the assigning of the one or more service actions from the list of pending service actions to the service window, and the ranking of each service action in the list of pending service actions according to the one or more service action criteria.

15. The method of claim 14, wherein adjusting the one or more aspects of the service window includes at least one of adjusting an allotted time associated with the service window, adjusting one or more service actions assigned to the service window, adjusting an order of the one or more service actions assigned to the service window, adjusting a route associated with the one or more service actions assigned to the service window, adding a service action to the one or more service actions assigned to the service window, removing a service action from the one or more service actions assigned to the service window, changing a duration of a service action assigned to the service window, changing a start time of a service action assigned to the service window, and changing an end time of a service action assigned to the service window, or any combination thereof.

16. The method of claim 15, comprising:
selecting which service actions to assign to the service window based at least in part on the ranking of each service action in the list of pending service actions according to the one or more service action criteria; and
determining an optimized order in which to perform the one or more service actions assigned to the service window based at least in part on one or more aspects of the service actions assigned to the service window.

17. A computer-program product to improve service action efficiency comprising:
a non-transitory computer-readable medium storing instructions thereon, the instructions being executable by one or more processors to perform the steps of:
monitoring events on one or more storage systems, wherein a first storage system from the one or more storage systems includes a first indoor positioning system (IPS) locator, and wherein a second storage system from the one or more storage systems includes a second IPS locator;
detecting a service event among the monitored events;
creating a service action for the detected service event;
adding the service action to a list of pending service actions associated with the one or more storage systems, each service action in the list of pending service actions representing an adverse condition awaiting repair in relation to at least one of the one or more storage systems;
ranking each service action in the list of pending service actions according to one or more service action criteria;
assigning one or more service actions from the list of pending service actions to a service window based at least in part on the ranking of the service actions in the list of pending service actions, wherein a first service action assigned to the service window is associated with the first storage system, and wherein a second service action assigned to the service window is associated with the second storage system;

generating a service map associated with the one or more service actions assigned to the service window;

determining a location of the first service action based on a location indicated by the first IPS locator of the first storage system;

determining a location of the second service action based on a location indicated by the second IPS locator of the second storage system;

depicting on the service map the determined location of the first service action assigned to the service window, the determined location of the second service action assigned to the service window, and at least one area and a location in the at least one area of each of the one or more storage systems, wherein the one or more storage systems include at least one of a computing device with a storage device, a network device with a storage device, a storage server, a storage enclosure, a cloud storage system, and a distributed storage system, or any combination thereof; and providing guidance from the location of the first service action to the location of the second service action, wherein the guidance includes audio guidance or graphical guidance, or a combination of audio guidance and graphical guidance.

18. The computer-program product of claim 17, wherein the one or more service action criteria includes at least one of event type, event severity, storage system identifier, event location, number of service actions in the list of pending service actions, service action duration, service window duration, and a distance between an event location of a first service action assigned to the service window and an event location of a second service action assigned to the service window, or any combination thereof.

* * * * *